United States Patent
Grabhorn et al.

(10) Patent No.: US 7,490,635 B2
(45) Date of Patent: *__Feb. 17, 2009__

(54) METHOD FOR FILLING A PRESSURE VESSEL WITH GAS

(75) Inventors: Hermann Grabhorn, Düsseldorf (DE); Ulrich Klebe, Kerken (DE); Friedel Michel, Erkrath (DE)

(73) Assignee: L'Air Liquide, Societe Anonyme pour l'Etude et l'Exploitation des Procedes Georges Claude, Paris Cedex (FR)

( * ) Notice: Subject to any disclaimer, the term of this patent is extended or adjusted under 35 U.S.C. 154(b) by 137 days.

This patent is subject to a terminal disclaimer.

(21) Appl. No.: 10/576,013

(22) PCT Filed: Oct. 15, 2004

(86) PCT No.: PCT/EP2004/052560

§ 371 (c)(1),
(2), (4) Date: Apr. 17, 2006

(87) PCT Pub. No.: WO2005/043033

PCT Pub. Date: May 12, 2005

(65) Prior Publication Data

US 2007/0017597 A1    Jan. 25, 2007

(51) Int. Cl.
*B65B 1/04*    (2006.01)
(52) U.S. Cl. ............................. 141/2; 141/11; 141/82; 141/95

(58) Field of Classification Search .................. 141/82, 141/2, 11, 69, 95; 137/334; 53/403, 440
See application file for complete search history.

(56) References Cited

U.S. PATENT DOCUMENTS

| 3,723,035 | A | * | 3/1973 | Franke | ......................... | 425/71 |
| 4,556,091 | A | * | 12/1985 | Poulsen | ........................ | 141/82 |
| 4,922,973 | A | * | 5/1990 | Keneavy | ......................... | 141/4 |
| 5,022,442 | A | * | 6/1991 | Bird | ............................ | 141/100 |
| 5,644,920 | A | * | 7/1997 | Lak et al. | ...................... | 62/47.1 |
| 5,900,538 | A | * | 5/1999 | Bastian | ........................ | 73/49.2 |
| 6,726,241 | B2 | * | 4/2004 | Welz | ............................ | 280/737 |
| 2007/0246121 | A1 | * | 10/2007 | Michel et al. | .................. | 141/4 |
| 2008/0016884 | A1 | * | 1/2008 | Kesten et al. | ................. | 62/47.1 |

FOREIGN PATENT DOCUMENTS

| DE | 198 17 324 | 10/1999 |
| DE | 101 07 895 | 9/2002 |
| DE | 101 19 115 | 10/2002 |
| JP | 57 200793 | 10/1982 |
| JP | 63013999 | 1/1988 |

* cited by examiner

*Primary Examiner*—Gregory L Huson
*Assistant Examiner*—Jason K Niesz
(74) *Attorney, Agent, or Firm*—Young & Thompson

(57) ABSTRACT

A method for filling a pressure vessel, for example an airbag system, with a gas or gas mixture. The filling is accomplished by cooling a pressure vessel, filling said vessel with at least one type of gas at a temperature which is higher than the boiling point thereof and closing the cold vessel. A pressure is produced in the filled and closed vessel by heating said vessel at an ambient temperature.

18 Claims, 2 Drawing Sheets

METHOD FOR FILLING A PRESSURE VESSEL WITH GAS

BACKGROUND OF THE INVENTION

1. Field of the Invention

Figure 1:
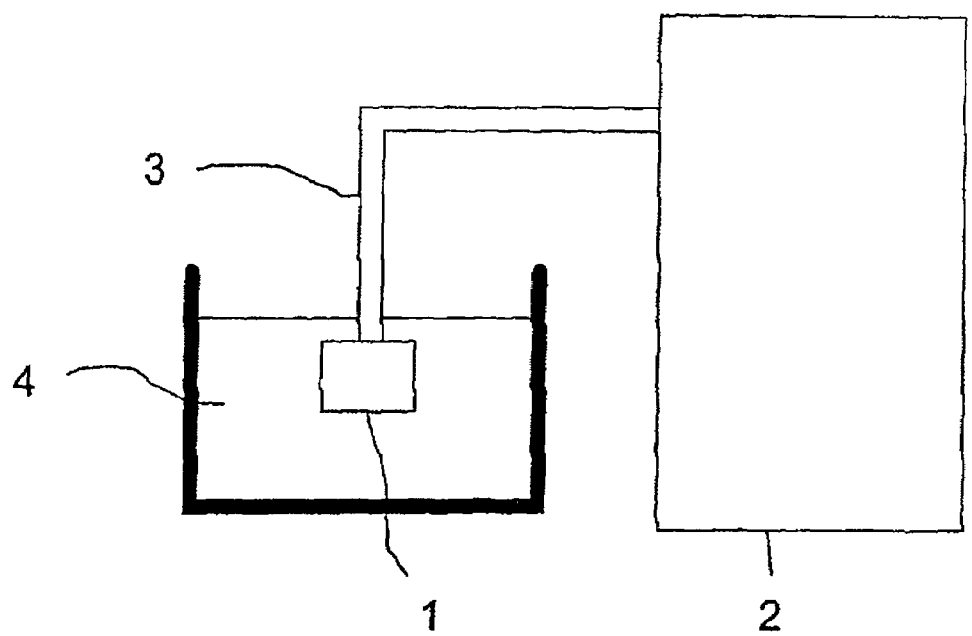

The invention relates to a method for filling pressure vessels, in particular pressure vessels in airbag systems, with gas.

2. Description of the Related Art

Airbags in vehicles are increasingly using new gas generators which inflate the airbag within a few milliseconds in the event of an accident. At present, three types of gas generators are in use:

chemical generators, in which the gas is generated by the reaction of a chemical solid with ambient air;

what are known as hybrid generators, which comprise a combination of solid fuel and compressed-gas packing; and pure gas generators with a high-pressure gas storage system with pressures of up to 700 bar at 15° C.

The gas generators, which are filled with various gases, present huge technical problems in production, both in terms of their own production and during filling with pressures of up to 1000 bar. These pressures are required in particular for rapid filling on account of the heat of compression in order for the accurately predetermined masses of gas to be introduced. These masses are of crucial importance to the subsequent inflation characteristics of the airbag.

Examples of gases used include argon, oxygen, nitrogen, dinitrogen monoxide (laughing gas), both in the form of ultrapure gases and in the form of gas mixtures made up of these components.

Demands imposed on gas-filled gas generators are:
1. Filling pressures of up to 1000 bar (P(T)) for a higher storage density or more compact overall dimensions.
2. Accurate filling quantity determination at high pressures.
3. Rapid filling, since it is this operation which determines the cycle times.
4. The operation must be highly reproducible.

Very expensive and complex piston or diaphragm compressors are required in order to generate the very high pressures. This leads to high investment costs, high operating and maintenance costs. In addition, a correspondingly complex and expensive downstream gas supply is required for these pressures.

On account of the heat of compression and the uneven temperature distribution in the pressure vessel, the inaccuracy of the precise filling quantity determination rises with increasing pressures, yet accurate determination is imperative for the subsequent defined functioning of the generator.

As pressures increase, it becomes technically more difficult and expensive to achieve fast filling times. There is a direct relationship between filling time and warming during the filling operation, i.e. the more quickly filling takes place, the greater the rise in gas temperature, with the result that this filling pressure has to be increased still further in order to achieve the precise quantity of gas for 15° C. or another defined temperature.

The reproducibility becomes more difficult for the reasons mentioned above and entails complex QA measures, such as for example weighing of the filled vessels for accurate filling quantity determination. At the same time, a significant rise in scrap rates is expected at higher pressures. This in turn adversely affects the economics of the entire process and therefore leads to higher production costs.

BRIEF SUMMARY OF THE INVENTION

The invention is based on the object of providing an alternative process for the high-pressure gas filling of pressure vessels, in particular of pressure vessels in airbag gas generators.

In the method for the high-pressure filling of a pressure vessel with a gas or gas mixture, the pressure vessel is cooled and filled with at least one gas, e.g. two or more gases, at a temperature above the boiling temperature of the gas or gases, and is then closed in the cooled state. The filling pressure of the pressure vessel is generally produced by warming the filled and closed pressure vessel. This usually involves warming to ambient temperature or the temperature of use of the pressure vessel. In the case of filling with two or more gases, the gases are preferably introduced successively into the cooled pressure vessel. It is in this way possible to produce gas mixtures.

For filling, the cooled pressure vessel is connected to a compressed-gas source. The compressed-gas source is at a higher temperature than the cooled pressure vessel. The compressed-gas source is generally uncooled. The compressed-gas source is, for example, at ambient temperature or a higher temperature. The compressed-gas source generally contains a compressed gas or gas mixture, preferably compressed in high pressure. By way of example, the gas or gas mixture in the compressed-gas source is at a pressure of greater than or equal to 100 bar absolute, greater than or equal to 200 bar absolute, greater than or equal to 300 bar absolute or greater than or equal to 400 bar absolute.

Advantageously, filling of the pressure vessel does not involve the use of a means or apparatus for mechanically compressing the gas which is to be introduced, such as a compressor or a gas pump. This means that there is no mechanical compression of the gas or gas mixture which is introduced into the cooled pressure vessel between the compressed-gas source and the pressure vessel.

The method is preferably used to fill a pressure vessel in an airbag system with a gas or gas mixture.

The pressure vessel corresponds, for example, to a pressure vessel in standard gas generators for airbag systems.

The pressure vessel is preferably part of a gas generator of an airbag system. The pressure vessel is, for example, also an independent part, such as a pressure canister, an ultra-small compressed-gas vessel or a relatively small compressed-gas vessel. The pressure vessel is preferably a compressed-gas vessel which is suitable for cryogenic applications, is able to withstand the sudden, local temperature changes between ambient temperature and the filling temperature, for example as low as −200° C., brought about by the cryogenic filling operation and securely encloses the gas which has been introduced at the storage pressures which result after the rise in temperature. Suitable materials for the pressure vessels include, for example, the standardized, meta-stable austenitic CrNi steels, in particular grades 1.4301, 1.4307, 1.4306, 1.4541.

In the method, the pressure vessel, for example a chamber which is to be filled in a gas generator of an airbag system, is connected to a compressed-gas source for the filling gas. This generally done using a gas conduit. The compressed-gas source is, for example, a compressed-gas container, in particular a compressed-gas cylinder, or a high-pressure gas supply. After the filling chamber has been connected to the compressed-gas source, the walls of the chamber which is to be filled, i.e. of the pressure vessel, are cooled to the filling temperature. The filling temperature is generally below 0° C., preferably below minus 50° C. and particularly preferably below minus 100° C., and in particular at a temperature below minus 150° C. Filling at the boiling temperature of cryogenically liquefied hydrogen (−253° C.), cryogenically liquefied nitrogen (−196° C.), cryogenically liquefied oxygen (−183° C.), cryogenically liquefied argon (−186° C.) or other refrigerants or salt solutions and at the sublimation temperature of, for example, dry ice (−78.5° C.) is advantageous, depending on the type of filling gas and the filling pressure which it is desired to generate. The pressure vessel is preferably cooled to a constant temperature. The cooling is effected for example by means of a refrigeration bath or immersion bath with a cooling liquid (e.g. cryogenically liquefied gases), a cooling block (e.g. a cooled metal block), a cold gas (e.g. using a gas tunnel), cold solid particles (e.g. cooled metal beads, dry ice particles), a cold solid (e.g. dry ice) or a cooling device which can be thermostated. By way of example, the cooling takes place in an immersion bath containing a refrigerant, such as cryogenically liquefied nitrogen (LN2). A refrigeration bath containing a cryogenically liquefied gas or dry ice offers the advantage of good heat transfers and therefore excellent temperature stability.

It is particularly advantageous to use a cryogenically liquefied gas (e.g. LN2) as refrigerant in a refrigeration bath:

At the boiling point, the temperature is dependent only on the pressure, i.e. is accurately defined for example at constant ambient pressure.

The good heat transfer in the boiling liquid brings the vessel and its contents quickly to likewise precisely the boiling temperature.

The filling pressure for achieving the required filling quantity is drastically reduced compared to a conventional filling method, e.g. to 20-25%, i.e. by a factor of 4 to 5.

The gas or gas mixture which is to be stored advantageously passes into the pressure vessel in the cryogenic, gaseous state (e.g. through cooling in the pressure vessel or through cooling upstream of the pressure vessel). The pressure vessel is advantageously evacuated prior to the filling operation. For filling to be carried out, a connection is produced between the cooled pressure vessel and the generally uncooled compressed-gas source and a defined pressure is set. The compressed-gas source (e.g. a compressed-gas source containing the gas or gas mixture) is generally at a temperature in the range from 0° C. to 100° C. The compressed-gas source is, for example, at ambient temperature, in particular room temperature (15 to 30° C.). During the filling of the pressure vessel, the temperature of pressure vessel and compressed-gas source preferably differ by at least 50° C., particularly preferably by at least 100° C., in particular by at least 150° C. The temperature of the gas or gas mixture in the pressure vessel and compressed-gas source preferably differs by at least 50° C., particularly preferably by at least 100° C., in particular by at least 150° C., during the filling operation.

The pressure which is set or present, i.e. the pressure in the cooled pressure vessel (primary filling pressure), is generally in the range from over 1 bar up to 400 bar absolute, preferably in the range from 10 bar to 300 bar absolute, particularly preferably in the range from 50 bar to 150 bar absolute, in particular in the range from 70 bar to 100 bar absolute.

The filling temperature (cooling temperature) of the pressure vessel is preferably selected in such a way that the filling temperature is above the boiling point of the gas which has been introduced or the boiling point of the highest-boiling gas component of the gas mixture which has been introduced, so that there is no condensation of the gas in the pressure vessel.

This allows manometric monitoring of the filling and manometric determination of the filling quantity.

After the cooled pressure vessel has been filled, it is closed and then the pressure vessel is warmed together with the gas which has been introduced. It is generally warmed to the subsequent temperature of use (ambient temperature or room temperature). The warming is effected, for example, by removing the cooling source (e.g. by removing the filled pressure vessel from a refrigeration bath). The warming to ambient temperature therefore takes place, for example, through heat exchange with the environment. Alternatively, the warming is also effected by active heating. The final filling pressure or secondary filling pressure (equilibrium pressure) is set to the desired temperature, generally ambient temperature, after warming. The final filling pressure is determined by the quantity of gas introduced.

It is preferable to use a permanent gas with a boiling temperature of at most minus 100° C. or a gas mixture comprising gas components with a boiling temperature of at most minus 100° C., e.g. the gases or gas components helium (He), hydrogen ($H_2$), nitrogen ($N_2$), oxygen ($O_2$) or argon (Ar). Pressure vessels and gas generators with a pure helium filling are of particular interest. Helium has a positive Joule-Thomson coefficient. This means that this gas does not cool down during the rapid expansion.

Table 1 lists, by way of example, suitable filling temperatures for various filling gases.

TABLE 1

Examples of gases and filling temperatures (l. = liquid)

| Gas or gas mixture | Filling temperature/° C.; refrigerant (cryogenically liquefied gases) | | | |
|---|---|---|---|---|
| Helium | −253° C.; l. $H_2$ | −196° C.; l. $N_2$ | −186° C.; l. Ar | −183° C.; l. $O_2$ |
| Hydrogen | | −196° C.; l. $N_2$ | −186° C.; l. Ar | −183° C.; l. $O_2$ |
| Nitrogen | | | −186° C.; l. Ar | −183° C.; l. $O_2$ |
| Argon | | | | −183° C.; l. $O_2$ |
| Oxygen | Greater than −183° C., e.g. −78.5° C. (dry ice cooling) | | | |
| Ar/He/$O_2$, 77:3:20% by volume | Greater than −183° C., e.g. −78.5° C. (dry ice cooling) | | | |
| $N_2$/He/$O_2$, 77:3:20% by volume | Greater than −183° C., e.g. −78.5° C. (dry ice cooling) | | | |
| $N_2$/He, 97:3% by volume | −186° C.; l. Ar or −183° C.; l. $O_2$ | | | |

Depending on how great a quantity of gas is supplied, it is therefore possible to realize very high storage pressures, in particular even of over 300 bar, in particular over 400 bar, without major technical and energy outlay.

The filling temperatures, in particular in Table 1, correspond to the boiling temperatures of the refrigerants at ambient pressure. It is possible to set higher filling temperatures when using the refrigerants by increasing the pressure up to at most the critical pressure. In this method variant, by way of example the immersion bath is closed off in a pressure-tight manner. Therefore, the invention also relates to a method in which pressurized refrigerants are used. It is advantageous for the temperature of the refrigeration bath or of a correspondingly deployed refrigeration source comprising a refrigerant to be altered, controlled and/or regulated by changing the pressure acting on the refrigerant.

The advantages of the method:

Filling can be carried out at significantly lower working pressures.

There is no need for ultra-high pressure compressors, but rather standard components can be used.

Correspondingly more economical, lower maintenance and operating costs.

Reproducible and accurate.

Low scrap rates.

High efficiency, e.g. in the case of helium, low losses. Correspondingly more economical.

Less outlay on quality assurance, or even the possibility of completely eliminating quality assurance.

The process is fast and can be highly automated.

The invention also relates to the use of an apparatus comprising at least one compressed-gas source, at least one pressure vessel with cooling device, a connecting line between compressed-gas source and pressure vessel and at least one valve, for filling pressure vessels of airbag systems with at least one gas or gas mixture without mechanical compression.

BRIEF DESCRIPTION OF THE DRAWING FIGURES

The invention is explained on the basis of the drawing.

FIG. 1 shows a highly simplified schematic of a filling device for pressure vessels.

Figure 2:
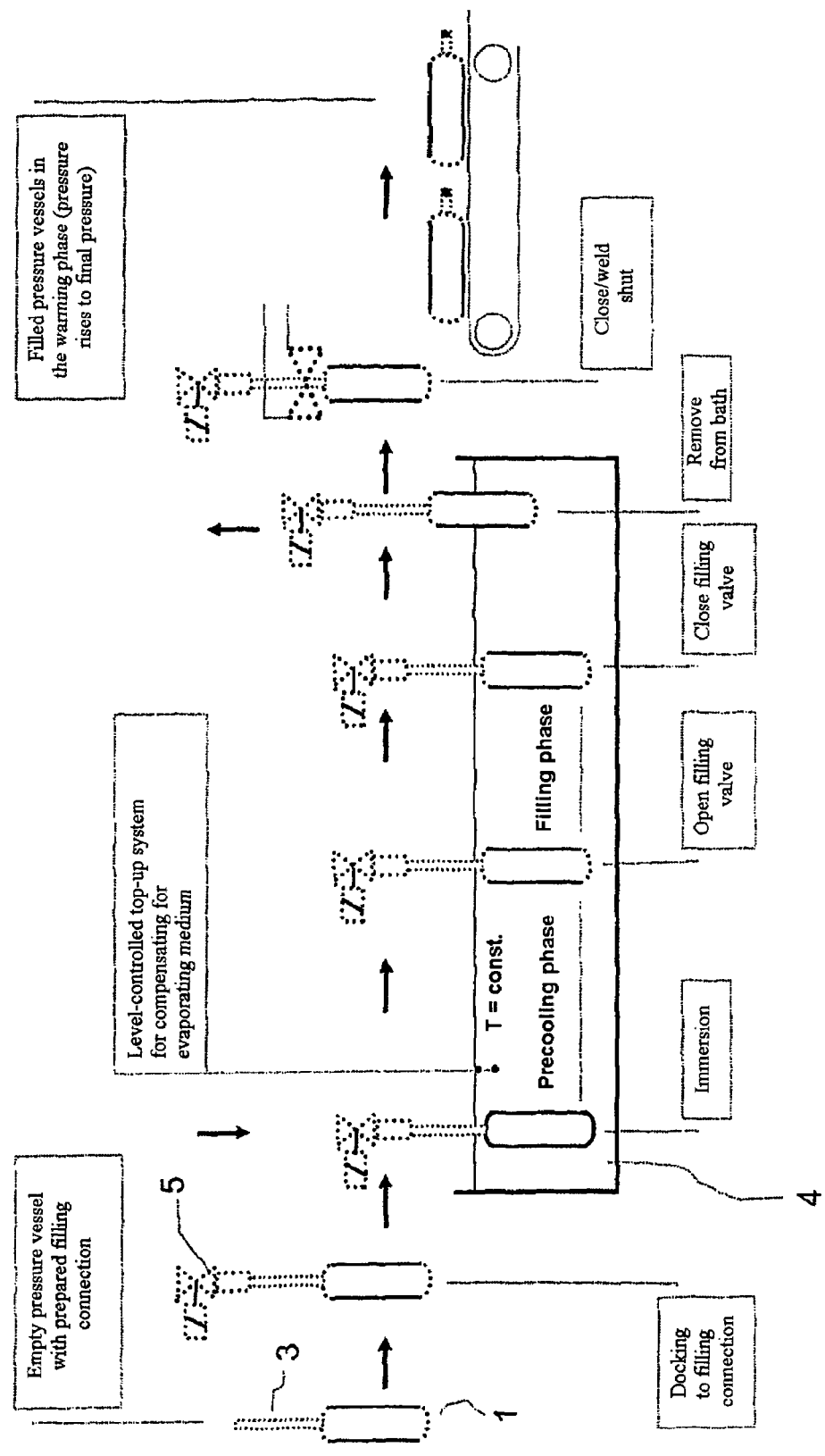

FIG. 2 diagrammatically depicts, as an example, the various stages of a filling process for pressure vessels.

DETAILED DESCRIPTION OF THE PREFERRED EMBODIMENT

The filling device shown in FIG. 1 has a pressure vessel 1 which is to be filled, a compressed-gas source 2, e.g. a compressed-gas cylinder (filling pressure for example 300 bar) containing helium or hydrogen with shut-off valve and pressure reducer, a gas connecting conduit 3 and a refrigeration bath 4 containing a cryogenically liquefied gas, such as liquid nitrogen, as refrigerant. The pressure vessel 1 is, for example, part of a gas generator of an airbag system or a gas canister.

After the pressure vessel 1 has been immersed in the refrigeration bath 4, the gas which is to be introduced is passed from the compressed-gas source 2 into the pressure vessel 1 by setting a desired pressure (e.g. 90 bar absolute; set at the pressure reducer of the compressed-gas cylinder). The gas, for example helium or hydrogen, quickly adopts the temperature of the surface and therefore the boiling temperature of the refrigerant. In the pressure vessel 1, the gas is cooled to the temperature of the refrigeration bath. The boiling temperature of the gas is below the temperature of the refrigeration bath, so that no condensation of the gas occurs in the pressure vessel 1. A density which corresponds to the temperature and is significantly higher than at room temperature is established. The required filling mass of the gas can easily be set accurately and reproducibly by means of the filling pressure given the constant temperature of the refrigeration bath. Then, the pressure vessel 1 is closed under pressure using suitable means. The closure of the pressure vessel 1 is effected, for example, at the filling pipe (gas feed conduit 3), which is pinched and/or welded shut immediately after temperature equalization at the filling temperature. Then, the vessel is removed from the refrigeration bath and warmed.

The increase in temperature (warming) generates an increase in pressure (approx. 3.7 times in the case of helium, approx. 5 times in the case of $H_2$, for a temperature rise from 77 to 288 K). Filling pressures of, for example, 700 bar or 1000 bar (at room temperature) can be generated using gas from a compressed-gas container, in particular from conventional compressed-gas cylinders. The method preferably does not use any means of generating pressure (e.g. compressor or gas pump) between pressure vessel 1 and compressed-gas source 2.

FIG. 2 illustrates steps involved in the gas filling of pressure vessels 1. During the filling operation, the pressure vessel is connected to the compressed-gas source 2 (not shown). The connection is effected by a filling conduit fitting at the shut-off valve 5. The method preferably operates without the use of a compressor or a pump.

The invention claimed is:

1. A method for high-pressure filling of a pressure vessel adapted for an airbag system with a gas or gas mixture, comprising:

cooling and filling the pressure vessel while said pressure vessel is moving through a cooling bath with at least one gas at a temperature above a boiling temperature of the gas, the pressure vessel being closed in the cooled state and a pressure of more than 300 bar is produced in the filled and closed pressure vessel by warming the gas or gas mixture, wherein determination and monitoring of a filling quantity during the filling operation are effected manometrically.

2. The method as claimed in claim 1, wherein the warming of the gas is effected after removal from the cooling bath by active heating or by temperature equalization to room temperature, ambient temperature, a temperature above 0° C. or another temperature.

3. The method as claimed in claim 1, wherein a pure gas with a boiling temperature of less than minus 50° C. or a gas mixture whose highest-boiling gas component has a boiling temperature of less than minus 50° C. is used for filling.

4. The method as claimed in claim 1, wherein the filling of the pressure vessel takes place at a temperature of at least minus 50° C. or below.

5. The method as claimed in claim 1, wherein the filling of the pressure vessel takes place at constant or substantially constant temperature.

6. The method as claimed in claim 1, wherein during the filling of the pressure vessel the pressure vessel is connected to a compressed-gas source, the compressed-gas source being at a temperature which is above the temperature of the pressure vessel.

7. The method as claimed in claim 1, wherein during the filling of the pressure vessel the pressure vessel is connected to a compressed-gas source, and the temperature of pressure vessel and compressed-gas source differ by at least 50° C. and/or the temperature of the gas or gas mixture in the pressure vessel and compressed-gas source differ by at least 50° C.

8. The method as claimed in claim 1, wherein the pressure vessel is filled with a gas mixture by filling with a previously produced gas mixture or by successive filling with the gas components of the gas mixture that is to be produced.

9. The method as claimed in claim 1, wherein the filling of the pressure vessel is carried out with a pressurized gas or gas mixture.

10. The method as claimed in claim 1, wherein the filling of the pressure vessel takes place at a pressure of at least 10 bar absolute.

11. The method as claimed in claim 1, wherein the filling of the pressure vessel takes place at a pressure in the range from 50 to 400 bar absolute.

12. The method as claimed in claim 1, wherein the filling of the pressure vessel is carried out using a precooled gas or gas mixture.

13. The method as claimed in claim 1, wherein the gas or gas mixture is precooled to the filling temperature.

14. The method as claimed in claim 1, wherein a pressurized refrigerant is used for the cooling, or the temperature is set, controlled or regulated during cooling by the action of pressure.

15. The method as claimed in claim 1, where a gas or gas mixture with a boiling temperature at a standard pressure of less than minus 200° C. is maintained during the filling of the pressure vessel.

16. The method as claimed in claim 15, wherein a gas or gas mixture containing at least 50% by volume of hydrogen or helium is used.

17. A method for high-pressure filling of an airbag gas generator, comprising: cooling and filling the airbag gas generator while said airbag gas generator is moving through a cooling bath with at least one gas at a temperature above a boiling temperature of the gas, the airbag gas generator being closed in the cooled state and a pressure of more than 300 bar is produced in the filled and closed airbag gas generator by warming the gas or gas mixture, wherein determination and monitoring of a filling quantity during the filling operation are effected manometrically.

18. A method for high-pressure filling of a pressure vessel adapted for an airbag system with a gas or gas mixture, comprising:

immersing the pressure vessel in a cooling bath;

precooling the pressure vessel while the pressure vessel is moving through the cooling bath;

filling the pressure vessel while said pressure vessel is moving through the cooling bath, the pressure vessel being being closed in the cooled state and a pressure of more than 300 bar is produced in the filled and closed pressure vessel by warming the gas or gas mixture, wherein determination and monitoring of a filling quantity during the filling operation are effected manometrically;

removing the pressure vessel from the cooling bath; and warming of the gas after removal from the cooling bath by active heating or by temperature equalization to room temperature, ambient temperature, a temperature above 0° C. or another temperature.

* * * * *